United States Patent Office 3,324,120
Patented June 6, 1967

3,324,120
CYCLOALKYL AND TRIDECYL MORPHOLINIUM SALTS
Anna Steimmig, Karl-Heinz Koenig, Walter Sanne, and Ernst-Heinrich Pommer, Ludwigshafen (Rhine), and Herbert Stummeyer, Mannheim, Germany, assignors to Badische Anilin- & Soda-Fabrik Aktiengesellschaft, Ludwigshafen (Rhine), Germany
No Drawing. Filed Aug. 7, 1963, Ser. No. 300,703
Claims priority, application Germany, Aug. 14, 1962, B 68,427
1 Claim. (Cl. 260—247.1)

This invention relates to fungicides.

We have found that compounds having the general formula

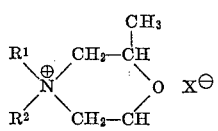

in which $R^1$ denotes a cycloalkyl radical or tridecyll radical, $R^2$ denotes an alkyl, alkenyl or methoxymethyl radical and X denotes the acid radical of a mineral acid or of an organic acid have good fungicidal activity.

The tridecyl radical is a mixture of isomers.

The active compounds are obtained by conventional methods, for example by treating tertiary heterocyclic amines with alkylating agents, particularly the alkyl esters of mineral acids. The reaction may be carried out with or without solvents. The use of a solvent having a high dipole moment is favorable. The following instructions explain this method of production by way of example:

50 parts (parts by weight) of 4-cyclooctyl-2,6-dimethyl-morpholine and 28 parts of dimethyl sulfate are stirred in 250 parts of acetonitrile for 24 hours at room temperature and for six hours at about 70° C. After the reaction mixture has been cooled and diluted with an equal volume of ether, 45 parts of 4-cyclooctyl-4-methyl-2,6-dimethylmorpholinium methosulfonate is obtained having a melting point of 149° C.

The morpholine derivative may be obtained for example by eliminating water by means of concentrated sulfuric acid from a N-cyclooctyl-N-di-(2-hydroxypropyl)-amine. The other morpholine derivatives may be prepared in an analogous way.

For example:

4-cyclooctyl - 4-allyl - 2,6-dimethylmorpholinium bromide.1H$_2$O. Syrupy compound:

Analysis: Found: C, 56.4%; H, 9.5%; O, 8.6%; N, 3.9%; Br, 21.6%. Calculated: C, 56.06%; H, 9.34%; O, 8.79%; N, 3.83%; Br, 22.0%.

4-tridecyl - 4-methoxymethyl - 2,6-dimethylmorpholinium chloride. Syrupy compound:

Analysis.—Found: C, 65.5%; H, 11.8%; O, 7.4%; N, 4.0%; Cl, 11.3%. Calculated: C, 66.8%; H, 11.64%; O, 8.46%; N, 3.7%; Cl, 9.4%.

4-tridecyl - 4-allyl - 2,6-dimethylmorpholinium bromide.½H$_2$O. Syrupy compound:

Analysis.—Found: C, 62.0%; H, 10.7%; O, 6.3%; N, 3.3%; Br, 17.9%. Calculated: 62.12%; H, 10.13%; O, 5.65%; N, 3.3%; Br, 18.8%.

4-tridecyl - 4-methyl-2,6-dimethylmorpholinium methosulfonate. Syrupy compound:

Analysis.—Found: N, 3.6%. Calculated: N, 3.53%.

4-cyclohexyl - 4-methyl - 2,6-dimethylmorpholinium ethosulfonate. (M.P. 90° C.; N: found, 4.3%; calculated, 4.3%).

4-cyclododecyl - 4-ethyl - 2,6-dimethylmorpholinium ethosulfonate. (M.P. 163° C.; N: found, 3.5%; calculated, 3.22%).

4-cyclooctyl-4-ethyl-2,6 - dimethylmorpholinium iodide. (M.P. 189° C.; N: found, 3.5%; calculated, 3.68%).

4-cyclooctyl - 4-ethyl - 2,6 - dimethylmorpholinium ethosulfonate. (M.P. 178–179° C.; N: found, 3.9%; calculated, 3.98%).

The form of the anion is not critical for the purposes of the invention because the fungicidal action is attributable to the cation.

The anion of the active substance may be a mineral acid, for example sulfuric acid or a halogen hydracid, or an organic acid, for example acetic acid, aminoacetic acid or benzoic acid.

Another method of preparing the active substances is by cyclization to a heterocyclic ring after quaternization of a dihydroxyalkyl-substituted amine.

The fungicidal and/or fungistatic agents according to this invention may be made into dust compositions in the conventional way by adding solid diluents or may be made into liquid formulations for the production of sprays by adding dispersing agents, wetting agents and/or adhesives. It is also possible for example to make them into solutions and emulsions which may be sprayed as aerosols by using the conventional solvents for this purpose. Incorporation of other fungicides and/or insecticides is also possible. The action of the compounds to be used according to this invention embraces particularly true mildew fungus, but also other injurious fungi, for example Cercospora musae on bananas, Piricularia oryzae on rice and Puccinia spec. on cereals. They may also be used for seed treatment.

The following example illustrates the good fungicidal action of the agents according to this invention.

*Example*

Leaves of barley seedlings grown in pots are sprayed with aqueous emulsions of 80% active substance and 20% emulsifying agent and after the sprayed coating has dried they are dusted with Oidia (spores) of barley mildew (*Erysiphe graminis* var. *hordei*). The test plants are then placed in a greenhouse at temperatures between 20° and 22° C. and at 75 to 80% relative humidity. The extent of the development of mildew fungus is determined after ten days. The results are tabulated below:

BARLEY MILDEW TEST

[0 indicates no attack; 1 to 5 indicate graduated attack up to total attack at 5; + indicates a mixture of isomers]

| Active substance | Attack on leaves after spraying with x. percent liquor of the active substance | | | |
|---|---|---|---|---|
| | x=0.0075 | x=0.015 | x=0.03 | x=0.06 |
| 4-cyclooctyl-4-methyl-2,6-dimethylmorpholinium methosulfonate | 1 | 0 | 0 | 0 |
| 4-tridecyl +-4-methoxymethyl-2,6-dimethylmorpholinium chloride | 1 | 0 | 0 | 0 |
| 4-tridecyl +-4-methyl-2,6-dimethylmorpholinium methosulfonate | 1 | 0 | 0 | 0 |
| 4-tridecyl +-4-allyl-2,6-dimethylmorpholinium bromide | 1 | 0 | 0 | 0 |
| 4-cyclooctyl-4-allyl-2,6-dimethylmorpholinium bromide | 1 | 1 | 0 | 0 |
| 2,4-dinitro-6-(methylheptyl)-phenyl crotonate [1] | 4 | 1 | 0 | 0 |
| Control (untreated) | 5 | 5 | 5 | 5 |

[1] Comparative agent.

What we claim is:
A compound of the formula

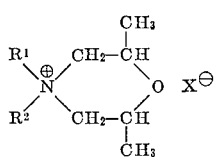

where R¹ is a member selected from the group consisting of cycloalkyl having 6 to 12 carbon atoms in the cycloalkyl ring and tridecyl, R² is a member selected from the group consisting of methyl, ethyl, allyl and methoxymethyl, and X is an anion selected from the group consisting of a mineral acid and an organic acid radical.

References Cited
UNITED STATES PATENTS

| | | | |
|---|---|---|---|
| 2,213,469 | 9/1940 | Leffler | 260—247 |
| 2,815,345 | 12/1947 | Zech | 260—247.2 |
| 2,879,199 | 3/1959 | Kosmin et al. | 167—33 |
| 2,960,433 | 11/1960 | Eden | 167—33 |

OTHER REFERENCES

Koenig et al., Chemical Abstracts, vol. 58, page 4581g (1963); effective date Aug. 31, 1962.

Koenig et al., Chemical Abstracts, vol. 59, page 1651 (1963); effective date Sept. 26, 1962.

ALEX MAZEL, *Primary Examiner.*

JULIAN S. LEVITT, *Examiner.*

D. B. MOYER, JOSE TOVAR, *Assistant Examiners.*

UNITED STATES PATENT OFFICE
CERTIFICATE OF CORRECTION

Patent No. 3,324,120                                      June 6, 1967

Anna Steimmig et al.

It is hereby certified that error appears in the above numbered patent requiring correction and that the said Letters Patent should read as corrected below.

Column 1, lines 15 to 19, for the lower right-hand portion of the formula reading

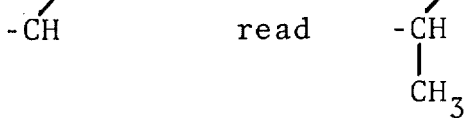

line 21, for "tridecyll" read -- tridecyl --; column 4, line 10, for "Aug. 31" read -- Aug. 21 --.

Signed and sealed this 26th day of November 1968.

(SEAL)
Attest:

Edward M. Fletcher, Jr.                                EDWARD J. BRENNER
Attesting Officer                                        Commissioner of Patents